(12) United States Patent
Kim et al.

(10) Patent No.: US 8,804,989 B2
(45) Date of Patent: Aug. 12, 2014

(54) FLEXIBLE RESONANCE UNIT FOR A SPEAKER

(75) Inventors: Kyung-Yeup Kim, Suwon-si (KR); Jung-Eun Han, Seoul (KR); Joon-Rae Cho, Seoul (KR); Ki-Won Kim, Suwon-si (KR); Sung-Wook Kang, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 275 days.

(21) Appl. No.: 13/105,230

(22) Filed: May 11, 2011

(65) Prior Publication Data
US 2011/0280430 A1 Nov. 17, 2011

(30) Foreign Application Priority Data
May 12, 2010 (KR) .................. 10-2010-0044380

(51) Int. Cl.
*H04R 1/20* (2006.01)
*H04R 1/02* (2006.01)

(52) U.S. Cl.
USPC .......................................... 381/345; 381/337

(58) Field of Classification Search
USPC .................................................. 381/337, 345
See application file for complete search history.

(56) References Cited

U.S. PATENT DOCUMENTS

| | | | |
|---|---|---|---|
| 2008/0013779 A1* | 1/2008 | Linn et al. | 381/396 |
| 2009/0010470 A1* | 1/2009 | Wang | 381/353 |
| 2009/0103757 A1* | 4/2009 | Chien et al. | 381/345 |
| 2009/0110228 A1* | 4/2009 | Chien et al. | 381/386 |
| 2011/0033066 A1* | 2/2011 | Siegrist | 381/118 |

* cited by examiner

*Primary Examiner* — Brian Ensey
*Assistant Examiner* — Katherine Faley
(74) *Attorney, Agent, or Firm* — Jefferson IP Law, LLP

(57) ABSTRACT

A resonance device for a speaker is provided. The device includes a speaker unit and a resonance unit. The speaker unit outputs a sound corresponding to a signal. The resonance unit is fixed to the speaker unit to provide a space for allowing a sound to resonate. The resonance unit is flexible, and the space for allowing a sound to resonate is variable.

14 Claims, 5 Drawing Sheets

FLEXIBLE RESONANCE UNIT FOR A SPEAKER

PRIORITY

This application claims the benefit under 35 U.S.C. §119 (a) of a Korean patent application filed in the Korean Intellectual Property Office on May 12, 2010 and assigned Serial No. 10-2010-0044380, the entire disclosure of which is hereby incorporated by reference.

BACKGROUND OF THE INVENTION

1. Field of the Invention

The present invention relates to a speaker. More particularly, the present invention relates to a resonance device for a speaker in which the resonance device provides a resonance space for improving a sound quality.

2. Description of the Related Art

Currently, as the electronic communication industry develops, mobile terminals, such as a mobile communication terminal (e.g., a cellular phone), an electronic organizer, a Personal Digital Assistance (PDA), etc. have become a necessity of modern society and play a role as an important means for quickly transferring information. Under these circumstances, a mobile terminal has been gradually advanced to provide additional functions and to have a light weight and a slim profile.

As a terminal provides additional functions, it becomes difficult to mount the necessary elements for the multi-functions while maintaining a light weight and a slim profile. For example, a speaker for outputting audible information may allow a sound to resonate in order to improve a sound quality but this requires space within the terminal. Accordingly, it is difficult to secure a resonance space in consideration of other elements and a limited space that is determined by a case frame.

SUMMARY OF THE INVENTION

Aspects of the present invention are to address at least the above-mentioned problems and/or disadvantages and to provide at least the advantages described below. Accordingly, an aspect of the present invention is to provide a resonance device for a speaker that may secure a resonance space to improve a sound quality.

Another aspect of the present invention is to provide a resonance device for a speaker having a resonance space whose volume is variable so that it may be conveniently mounted.

In accordance with an aspect of the present invention, a resonance device for a speaker is provided. The device includes a speaker unit for outputting a sound corresponding to a signal, and a resonance unit fixed to the speaker unit to provide a space for allowing a sound to resonate, wherein the resonance unit is flexible and the space for allowing a sound to resonate is reducible or expandable.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following description taken in conjunction with the accompanying drawings, in which.

Throughout the drawings, like reference numerals will be understood to refer to like parts, components and structures.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions may be omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

It is to be understood that the singular forms "a", "an", and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

FIGS. 1 through 5, discussed below, and the various exemplary embodiments used to describe the principles of the present disclosure in this patent document are by way of illustration only and should not be construed in any way that would limit the scope of the disclosure. Those skilled in the art will understand that the principles of the present disclosure may be implemented in any suitably arranged communications system. The terms used to describe various embodiments are exemplary. It should be understood that these are provided to merely aid the understanding of the description, and that their use and definitions in no way limit the scope of the invention. Terms first, second, and the like are used to differentiate between objects having the same terminology and are in no way intended to represent a chronological order, unless where explicitly stated otherwise. A set is defined as a non-empty set including at least one element.

Exemplary embodiments of the present invention provide a resonance device for a speaker, and more particularly, a technology for improving a characteristic of an output sound by expanding a speaker resonance space.

Figure 1:
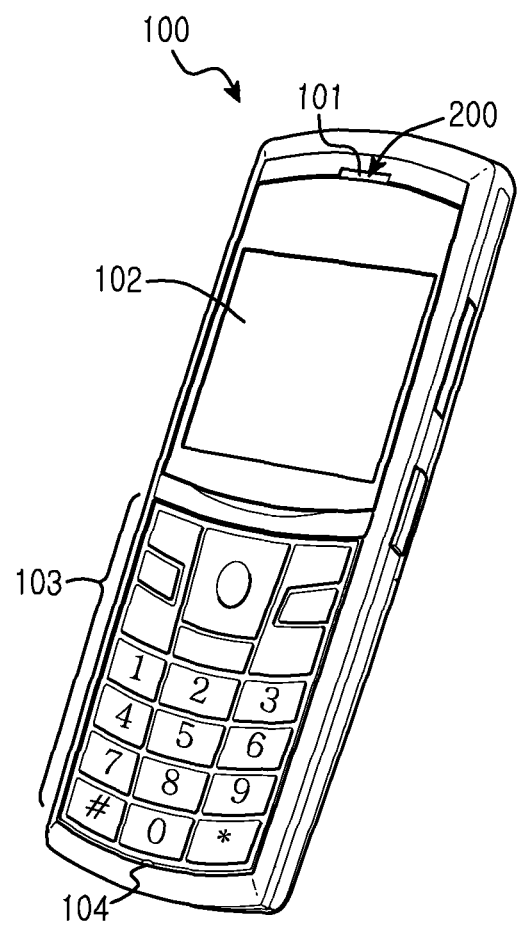
FIG. 1 illustrates a perspective view of a mobile terminal according to an exemplary embodiment of the present invention.

In describing exemplary embodiments of the present invention, the construction of the present invention is applied to a bar type mobile terminal as illustrated in FIG. 1. However, the present invention is not limited thereto but is applicable to mobile terminals such as a folder type mobile terminal, a slide type mobile terminal, etc. without departing from the scope of the present invention. Furthermore, a speaker resonance apparatus according to exemplary embodiments of the present invention is applicable to electronic apparatuses such as televisions, camcorders, etc.

FIG. 1 illustrates a perspective view of a mobile terminal according to an exemplary embodiment of the present invention.

Referring to FIG. 1, the mobile terminal 100 includes a speaker 101 for outputting a voice signal and a display 102 located below the speaker for outputting a video signal. Furthermore, the mobile terminal 100 includes a keypad assembly 103 that serves as a data input means, and a microphone 104 located below the keypad assembly 103 for inputting a voice signal. The display 102 may be a Liquid Crystal Display (LCD) having millions of pixels. In addition, in the case where a touch screen is provided to the LCD, the display 102 may perform a function of a data input unit as an auxiliary unit or in substitution for the keypad assembly 103.

More particularly, according to an exemplary embodiment of the present invention, the speaker 101 of the mobile terminal 100 secures a resonance space for improving a sound quality. The resonance space raises a sound pressure of a low frequency of the speaker 101 to produce smooth and natural sounds. Furthermore, the resonance space is variable. Hereinafter, the speaker and an instrument forming the variable resonance space are referred to as a speaker resonance apparatus.

Figure 2:
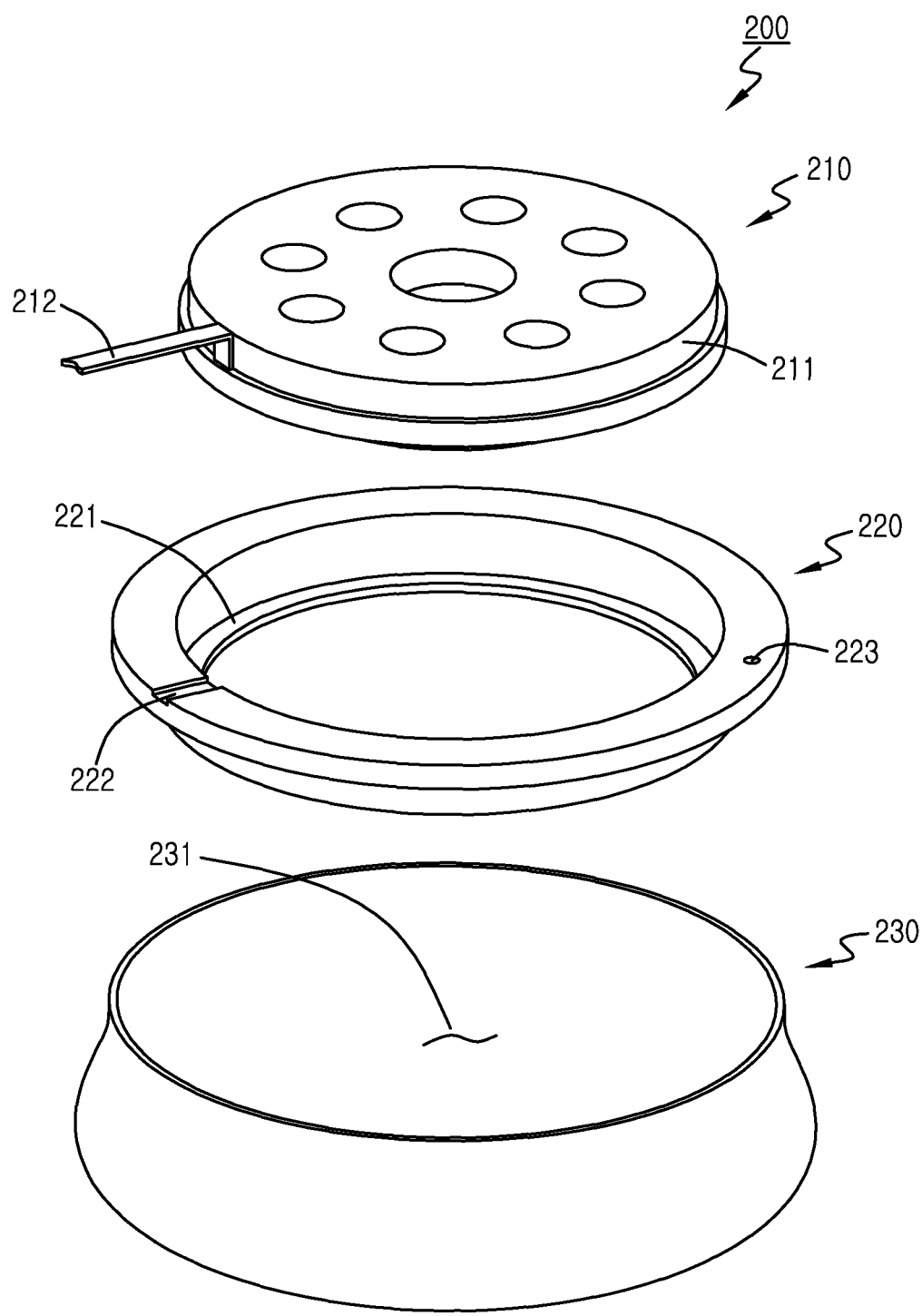
FIG. 2 illustrates a separated, perspective view of a speaker resonance apparatus according to an exemplary embodiment of the present invention.
Figure 3:
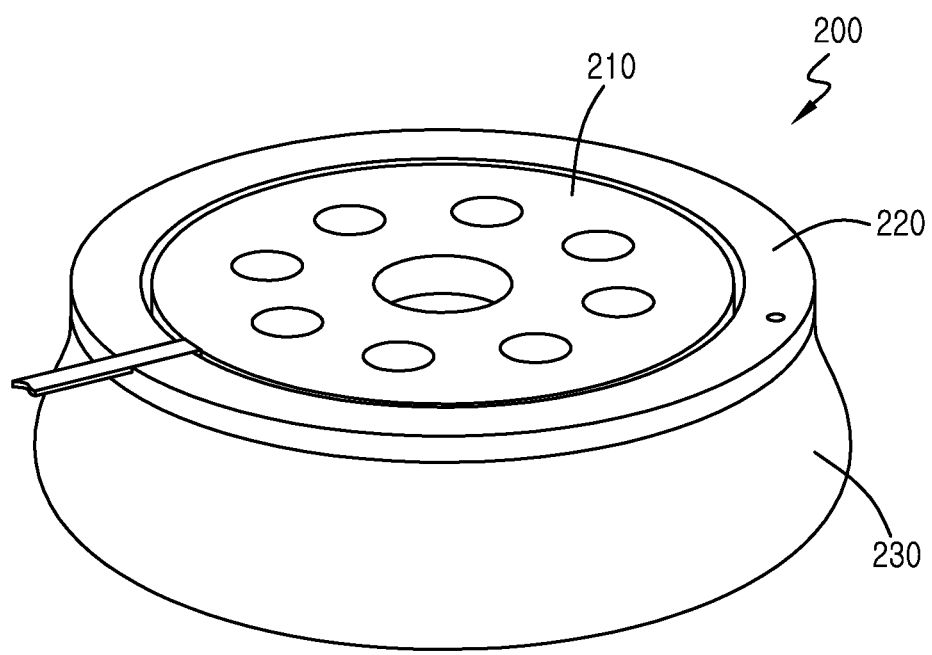
FIG. 3 illustrates a coupled, perspective view of a speaker resonance apparatus according to an exemplary embodiment of the present invention.

FIG. 2 illustrates a separated, perspective view of a speaker resonance apparatus according to an exemplary embodiment of the present invention, and FIG. 3 illustrates a coupled, perspective view of a speaker resonance apparatus according to an exemplary embodiment of the present invention.

Referring to FIGS. 2 and 3, the speaker resonance apparatus 200 includes a speaker unit 210 for outputting a sound corresponding to a signal, a fixing member 220 for fixing the speaker unit 210, and a resonance unit 230 coupled to the fixing member 220 to form a resonance space of the speaker unit 210.

The speaker unit 210 includes an electrical connector 212 for receiving a signal, and a speaker 211 for outputting a note corresponding to a signal provided via the electrical connector 212. The speaker 211 may be one of a dynamic type speaker, a crystal type speaker, and a condenser type speaker depending on a signal conversion scheme. The electrical connector 212 may be a wire or a Flexible Printed Circuit Board (FPCB).

The fixing member 220 is includes an opening The speaker unit 210 is coupled to the opening of the fixing member 220. In an exemplary implementation, the fixing member 220 may have a seat portion 221 for seating the speaker unit 210. The opening may form an additional resonance space for the speaker unit 210. That is, the opening of the fixing member 220 may provide an additional space to a resonance space formed by the resonance unit 230 which will be described later. In an exemplary implementation, the speaker unit 210 and the seat portion 221 are coupled through bonding. A buffering member may be interposed in preparation for an impulse, or a sealing member such as rubber may be interposed to increase air-tightness. In addition, the fixing member 220 may have a recess 222 for receiving the electrical connector 212 of the speaker unit 210 after seating the speaker unit 210. Furthermore, the fixing member 220 may include at least one vent hole 223 for communicating with the outside. While the volume of the resonance space changes, the vent hole 223 allows air generated by a pressure difference to flow. Furthermore, the fixing member 220 may be a case frame defining an outer surface of a terminal or a separate member coupled to the case frame forming the appearance of a terminal.

The resonance unit 230 is coupled to the fixing member 220 to form the resonance space 231. The resonance unit 230 and the fixing member 220 may be sealed using an adhesive agent. The adhesive agent may be silicon, a spray adhesive, an epoxy adhesive, and an equivalent thereof. The resonance unit 230 and the fixing member 220 may be separated by factors such as external force, heat, etc. depending on a selected adhesive agent, so that replacement and repair may be easy.

More particularly, the resonance unit 230 is formed of a flexible film to change the volume of an initial resonance space 231. In addition, the resonance unit 230 may be formed of an elastic film such as rubber, etc, so that it may restore the initial resonance space 231 after being flexed or deformed. Furthermore, the resonance unit 230 may block factors such as electricity, light, heat, etc. generated from other elements. As described above, the vent hole 223 of the fixing member 220 allows air generated by a pressure difference to flow when the volume of the resonance space changes.

Figure 4:
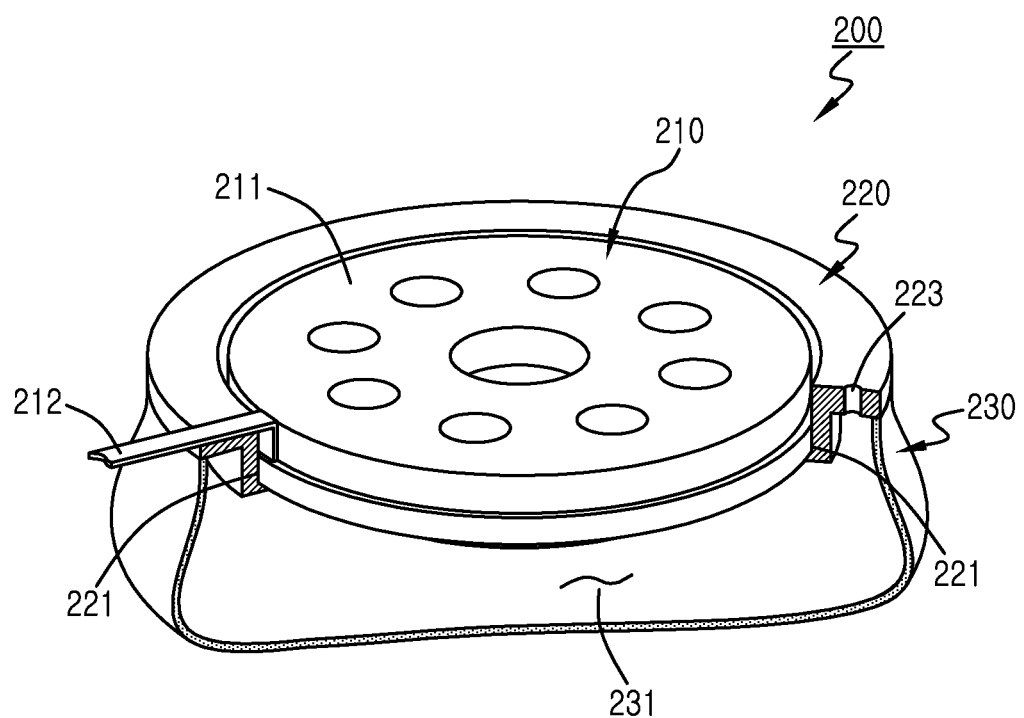
FIG. 4 illustrates a partial, cross-sectional view of a speaker resonance apparatus according to an exemplary embodiment of the present invention.

FIG. 4 illustrates a partial, cross-sectional view of a speaker resonance apparatus according to an exemplary embodiment of the present invention.

Referring to FIG. 4, the speaker resonance apparatus includes a resonance unit 230 for varying the volume of the resonance space for the speaker unit 210. The resonance unit 230 has flexibility (or elasticity), so that it can reduce or expand the volume of the initial resonance space 231. Generally, when the resonance unit 230 has elasticity, it has a tendency to reduce even when the volume of the resonance space is expanded. For this purpose, a support member for exerting a separate external force may be further provided. In an exemplary implementation, a space that is not occupied by other elements inside the case frame defines an outer surface of the terminal occupied by the resonance unit 230. That is, the resonance unit 230 having flexibility may be freely deformed to occupy a remaining space.

Figure 5:
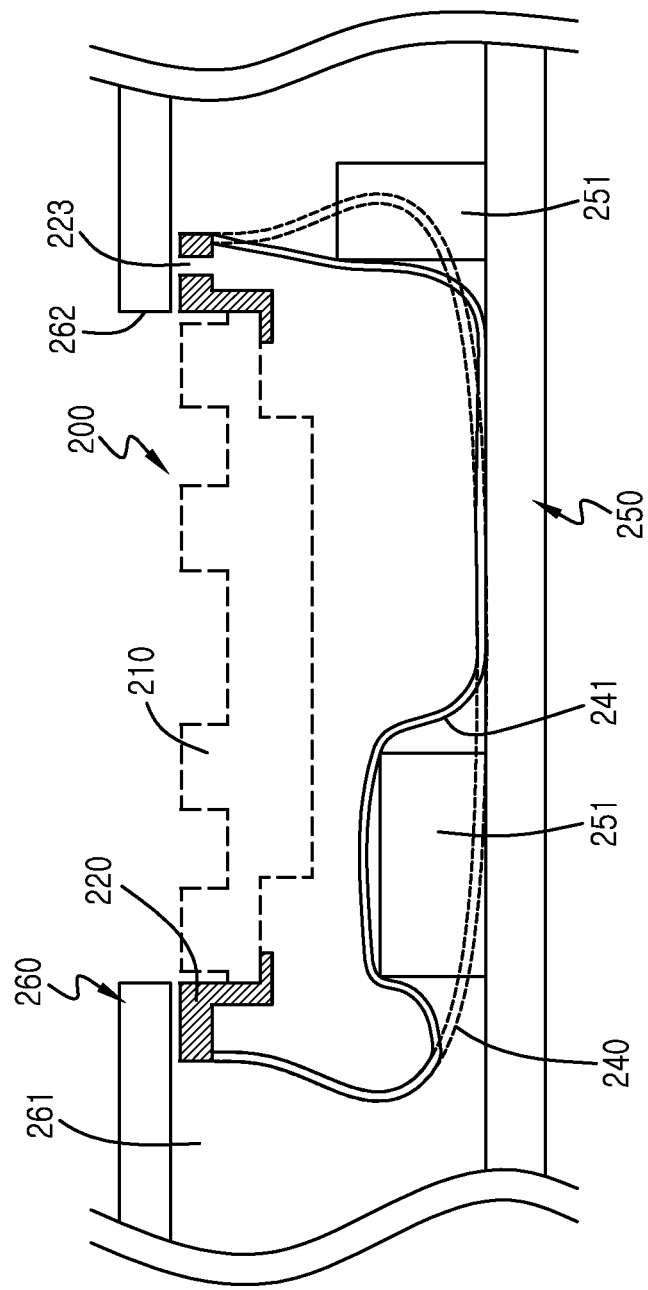
FIG. 5 is a view of a mounting of a speaker resonance apparatus according to an exemplary embodiment of the present invention.

FIG. 5 is a view illustrating a mounting of a speaker resonance apparatus according to an exemplary embodiment of the present invention.

Referring to FIG. 5, a terminal includes a case frame 260 defining an outer surface of the terminal and having a limited mount space 261. A main board 250 comprises a plurality of elements, such as chips 251, circuits, etc, which are surface-mounted. Also, a plurality of elements, such as a speaker resonance apparatus 200, etc, electrically connected to the main board 250, are mounted in the mount space 261. In addition, the case frame 260 includes an outlet or opening 262 for externally outputting a sound generated from the speaker resonance apparatus 200. The volume of the initial mount space 261 is reduced as the main board 250, chips 251 etc. are mounted. Under this circumstance, the speaker resonance apparatus 200 according to an exemplary embodiment of the present invention may secure the resonance space by deforming the resonance unit 230. As illustrated, when the speaker resonance apparatus 200 is mounted, the resonance unit 230 is deformed from an initial state 240 to a state 241 that can occupy a remaining space to secure the resonance space. The speaker resonance apparatus 200 may situationally secure the resonance space in a limited space even when the mount position changes. Furthermore, as described above, in the case where the resonance unit 230 is deformed, the vent hole 223 allows air to flow. After that, when the resonance unit 230 is deformed to secure the resonance space, the vent hole 223 may be sealed using a predetermined element when needed.

In addition, depending on implementation, the resonance unit 230 may be directly attached to the speaker unit 210 without the fixing member 220 interposed. This means that the mount space corresponding to the volume of the fixing member 220 is secured.

Furthermore, the speaker resonance apparatus 200 according to an exemplary embodiment of the present invention may be mounted on a terminal that uses a flexible substrate on which a flexible display is mounted. Since the flexible substrate is flexible and so may be folded or rolled, the speaker resonance apparatus 200 may secure the resonance space suitable for the circumstance.

Consequently, the speaker resonance apparatus according to an exemplary embodiment of the present invention varies the resonance space for improving a sound quality in a limited space, so that its mounting is convenient.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. An electronic device comprising:
   a case frame defining an outer surface of an electronic device and including an outlet;
   a main board disposed inside the case frame and including a plurality of electronic components mounted thereon; and
   a speaker resonance device disposed between the case frame and the main board,
   wherein the speaker resonance device comprises:
   a speaker unit disposed on the outlet of the case frame and connected to the main board to output a sound corresponding to a signal from the main board; and
   a flexible film fixed to the speaker unit to provide a space for allowing a sound to resonate,
   wherein the flexible film occupies at least part of a space between the case frame and the main board.

2. The device of claim 1, wherein the flexible film has elasticity.

3. The device of claim 1, wherein the speaker unit comprises at least one vent hole for communication between the space for allowing the sound to resonate and an external space.

4. The device of claim 3, wherein the vent hole is sealed.

5. The device of claim 1, further comprising a fixing member for coupling the speaker unit to the flexible film, wherein the fixing member is fixed on the outlet of the case frame.

6. The device of claim 5, wherein the fixing member includes an opening, the speaker unit is seated on an upper portion of the opening of the fixing member, and the flexible film is attached on a lower portion of the opening of the fixing unit, so that the opening of the fixing member forms an additional space for allowing a sound to resonate.

7. The device of claim 6, wherein the fixing member comprises at least one vent hole for communication between the space for allowing a sound to resonate and an external space.

8. The device of claim 7, wherein the speaker unit is attached on an upper portion of the opening of the fixing member with at least one of a sealing member and a buffering member interposed.

9. The device if claim 7, wherein the vent hole is sealed.

10. The device of claim 6, wherein one of the speaker unit and the flexible film is attached on the opening of the fixing member using an adhesive.

11. The device of claim 10, wherein the adhesive includes one of silicon, a spray adhesive, and an epoxy adhesive.

12. The device of claim 1, wherein the flexible film is attached on the speaker unit using an adhesive.

13. The device of claim 1, wherein the flexible film is made of at least one material capable of blocking at least one of electricity, light, and heat.

14. The device of claim 1, wherein the flexible film includes rubber.

* * * * *